(12) United States Patent  (10) Patent No.: US 8,139,334 B2
Saarinen (45) Date of Patent: Mar. 20, 2012

(54) OVER-VOLTAGE PROTECTION CIRCUIT

(75) Inventor: Pertti Saarinen, Salo (FI)

(73) Assignee: Nokia Corporation, Espoo (FI)

( * ) Notice: Subject to any disclaimer, the term of this patent is extended or adjusted under 35 U.S.C. 154(b) by 406 days.

(21) Appl. No.: 12/516,853

(22) PCT Filed: Dec. 1, 2006

(86) PCT No.: PCT/IB2006/003438
§ 371 (c)(1),
(2), (4) Date: Jun. 3, 2009

(87) PCT Pub. No.: WO2008/065471
PCT Pub. Date: Jun. 5, 2008

(65) Prior Publication Data
US 2010/0067158 A1    Mar. 18, 2010

(51) Int. Cl.
*H02H 3/22* (2006.01)
(52) U.S. Cl. ........................... 361/91.1; 361/111
(58) Field of Classification Search ............. 361/56, 361/91.1, 111
See application file for complete search history.

(56) References Cited

U.S. PATENT DOCUMENTS

| | | | |
|---|---|---|---|
| 6,064,554 A | 5/2000 | Kim | |
| 6,816,348 B2 * | 11/2004 | Chen et al. | 361/56 |
| 2009/0109587 A1 * | 4/2009 | Smith et al. | 361/86 |
| 2009/0154039 A1 * | 6/2009 | Tsugawa | 361/56 |

FOREIGN PATENT DOCUMENTS

| | | |
|---|---|---|
| DE | 29606469 A | 8/1996 |
| JP | 2001268809 A | 9/2001 |

OTHER PUBLICATIONS

"International Search Report and the Written Opinion of the International Searching Authority", received in corresponding PCT Application No. PCT/IB2006/003438, Dated Aug. 29, 2007, 9 pages.

* cited by examiner

*Primary Examiner* — Danny Nguyen
(74) *Attorney, Agent, or Firm* — Locke Lord LLP

(57) ABSTRACT

The present invention pertains to a closed loop over-voltage protection for audio/video connection interfaces of devices especially of mobile devices. The over-voltage protection circuit for mobile devices comprising at least one connector with at least one electrical contact for connecting external devices and at least one internal contact to a circuitry using said connector, wherein said over-voltage protection circuit comprises: an electrically operated switch connected between an electrical contact of said connector and an internal contact to said circuitry, a control element to operate said electrically operated switch, wherein said control element is connected to said switch to operate said switch, a first voltage determining unit to detect a voltage between said contact of said connector and said electrically operated switch, and which is connected to said control element, and a second voltage determining unit to detect a voltage between said internal contact to said circuitry and said electrically operated switch, and which is connected to said control element wherein said control element is configured to open or close said switch based on the voltages detected at said internal contact to said circuitry and said contact of said connector.

18 Claims, 7 Drawing Sheets

| | 3.5 mm / 2.5 mm PHASE 1 | | | | PHASE 2 | | |
|---|---|---|---|---|---|---|---|
| | 1 | 2 | 3 | 4 | 5 | 6 | 7 |
| | L > | L > | L > | L > | SPDIF out | SPDIF out | L < |
| | R > | R > | R > | R > | SPDIF in | C | R < |
| | MIC Button | MIC CTRL | Video | | Power out | Y | (Power out) |
| | GND | GND | GND | GND | GND | GND | GND |

Fig. 1 Signal multiplexing table based on a 4-contact plug

OVER-VOLTAGE PROTECTION CIRCUIT

RELATED APPLICATION

This application was originally filed as PCT Application No. PCT/IB2006/003438 filed Dec. 1, 2006.

The present invention pertains to a closed loop voltage protection for connection interfaces such as e.g. audio/video connection interfaces of devices especially of mobile devices. More specifically, the present invention pertains to the field of connectors to accessories of mobile devices when several possibilities are available for a user to contact potentially harmful devices providing at least potentially harmful voltages. The present invention offers a close loop feedback protection system close to the point of connection in that way offers protection via an over-voltage protection circuit for the mobile device.

At present there are large numbers of different connectors available for mobile devices such as cellular telephones available providing different connections such as audio/video connections to different connectable devices such as e.g. audio/video devices. For example the Nokia™ n-Gage™ telephone is provided with two 3- and 4-contact 2.5 mm jack plug audio connectors arranged side by side, one for a stereo headphone and one for a (single ear) telephone headset. A similar 3.5 mm connector is also used as microphone connector, stereo audio connector, 4-contact video cam connector, or even as special embodiment of Toslink™ optical audio connector.

There are a number of different connectors used for a large number of different applications. For example the PS2 connector known from Keyboards and mice is also used a power connector for external hard disc drives. Additionally the PS2 connector is quite similar to the external video connector known as S-VHS connector or the MINI-DIN connectors and the like.

That is, at present there are different signal standards using the same type of connector which intrinsically provides the danger of damaging on one hand the connector itself by forcing a similar looking plug into the wrong socket, or on the other hand by causing electrical damage when connecting a plug with a high voltage signal into a low voltage socket (or vice versa).

There are different over-voltage protection circuits known, such as the use of zenerdiodes or Z-diodes or the famous crowbar-circuit (a circuit to short-circuit a line to ground to break a fuse if an over-voltage is detected).

It is not possible to prevent a user from damaging devices by applying brute force when inserting a connector into an electronic device, and therefore there seems to be no possibility to prevent damage caused by brute force.

However, a user cannot sense voltages in a range up to e.g. 20V. This is a reason why a user is not capable of detecting any mistake (without reading the specifications or without using a multi-meter) before inserting a wrong plug into the wrong jack.

It is therefore desirable to have a mobile electronic device protected against the effects of high voltages applied to contacts that are damaged when high voltage is applied.

According to a first aspect of the present invention an over-voltage protection circuit for mobile devices is provided. The mobile device comprises at least one connector having at least one electrical contact for connecting external devices and at least one internal contact to a circuitry of the mobile device that may make use of said connector. The over-voltage protection circuit comprises an electrically operated switch, a control element, an electrically operated switch connected between an electrical contact of said connector and said internal contact to said circuitry and a first voltage determining unit. The control element is provided to operate said electrically operated switch and is connected to said switch to operate said switch. Said first voltage determining unit is provided to detect a voltage between said contact of said connector and said electrically operated switch. Said first voltage determining unit is connected to said control element. Said second voltage determining unit is connected to said control element. Said control element is configured to open or close said switch based on the voltages detected at said contact of said connector.

It may be noted that both voltages determined are expected to be the same when the switch is in the closed position.

This basic embodiment is drafted as a basic implementation wherein only one contact of the connector is protected by the voltage protection circuit.

In an example embodiment the over-voltage protection circuit further comprises a second voltage determining unit. Said second voltage determining unit is provided to detect a voltage between said internal contact to said circuitry and said electrically operated switch. Said second voltage determining unit is connected to said control element. In this embodiment said control element is configured to open or close said switch based on the voltages detected at said internal contact to said circuitry and said contact of said connector.

This embodiment may serve to detect considerable voltage differences between said internal contact to said circuitry and said contact of said connector.

This basic embodiment of the present invention may also be embodied with a single multi switch to simultaneously enable or disable a number of connections between the internal circuitry and the connector.

In an example embodiment said over-voltage protection circuit, further comprises at least one further electrically operated switch, at least one further first voltage determining unit, and at least one further second voltage determining unit.

Said at least one further electrically operated switch is interconnected between at least one further electrical contact of said connector and at least one further internal contact to said circuitry. Said control element is connected to each said at least one further electrically operated switch respectively to control said switches.

Said further first voltage determining unit is provided to detect a voltage at each said further contact of said connector, for each said further electrically operated switch.

Said further second voltage determining unit is provided to respectively detect a voltage at each said further internal contact to said circuitry, for each said further electrically operated switch.

Said control element is configured to open or close said switches according to the voltages detected at said internal contacts to said circuitry and said contacts of said connector.

This more sophisticated embodiment is drafted as an implementation wherein an arbitrary number of contacts of the connector is protected by the voltage protection circuit.

In case of non-mobile devices the present problem usually does not occur, as non-mobile devices usually are only installed and cabled once, while in the case of mobile devices there are a lot of different occasions in which a user may connect different (and even unknown) equipment such as headsets, headphones, video devices, chargers, computers and/or other components or devices to the mobile device.

In an example embodiment said over-voltage protection circuit, further comprises at least one further electrically operated switch and at least one a further first voltage determining unit.

Said at least one further electrically operated switch is interconnected between at least one further electrical contact of said connector and at least one further internal contact to said circuitry. Said control element is connected to each said at least one further electrically operated switch respectively to control said switches.

Said further first voltage determining unit is provided to respectively detect a voltage at each said further contact of said connector, for each said further electrically operated switch.

Said control element is configured to open or close said switches according to the voltages detected at said contacts of said connector.

This more sophisticated embodiment is drafted as an implementation wherein an arbitrary number of contacts of the connector is protected by the voltage protection circuit.

In another example embodiment said over-voltage protection circuit further comprises a switch matrix interconnected between at least two of said electrical contacts of said connector and at least two of said internal contacts to said circuitry, to reallocate or rearrange the connections between these contacts of said connector and said internal contacts to said circuitry.

The switch matrix may allow it to invert the voltage signal received from a DC charging device.

In yet another example embodiment said switch matrix is interconnected between said electrically operated switches and said contacts of said connector. This embodiment allows it to simply reallocate the contacts of the connector according to the signals received (especially when considering that the contacts to the circuitry are related to expectedly well-defined signals).

In still another example embodiment said switch matrix is interconnected between said electrically operated switches and said internal contacts to said circuitry. This embodiment allows it to simply reallocate the contacts of the connector according to e.g. applications and application specific contacts of the circuitry of the mobile device. That is, the switching matrix may be used to route the signals received from (the contacts of) the connector to application specific (integrated) circuits of the mobile device. It is also envisaged to use two switching matrices (one at each side of the electronically operated switches) to on the one hand reallocate the contacts of the connector and on the other hand to route a signal to certain (e.g. application specific) contacts of the circuitry of the mobile device.

In yet one other example embodiment said switch matrix is also comprised of said electronically operated switches. That is, the switching matrix allows it to disconnect all contacts of the connector from all contacts to the circuitry of the mobile terminal device.

In yet another example embodiment said switch matrix is (matrices are) controlled by said control element. This embodiment allows it to combine the over-voltage protection circuit and the switch matrix (or matrices) in a single circuit.

In still one other example embodiment said control element is connected to said circuitry of the mobile electronic device to control the switches of the switch matrix in accordance with signals received from said circuitry. This embodiment is tailored to the case in which the switch matrix is used to connect certain contacts of the connector to certain contacts of application specific (integrated) circuits of the circuitry of the mobile device.

In yet one other example embodiment said control element further comprises a battery voltage determining unit to detect a battery voltage of a battery of a mobile device said over-voltage protection circuit is built-in. In this embodiment said control element is configured to open said switches if the battery voltage falls below a predetermined threshold value. This embodiment serves to protect the mobile device from being discharged or damaged by short-circuited output terminals. It should be noted that it is also envisaged to implement an embodiment in which the switches are opened if first derivative of the battery voltage exceeds predetermined values (to prevent rapid discharging or charging at to high charging currents). It may be noted that the device may be configured to reset the switches after a certain period of time to allow e.g. a charging process to be performed via said connector.

In yet another additional example embodiment said control element further comprises an output signal contact connected to said circuitry to notify said circuitry that at least one of said switches between said connector and said internal contacts to said circuitry has been opened. This embodiment may serve to notify a user of the mobile device via the man-machine interfaces of the mobile device that an over-voltage event has been occurred and detected. This may also be embodied by an interrupt sent by said control element to said circuitry of said mobile device.

In an additional example embodiment of the present invention said control element further comprises a timer to output said signal after a determined period of time. It is envisaged to select the time in accordance with a voltage value indicating how much said voltage thresholds where exceeded. That is, if the measured/determined voltage exceeds the voltage threshold only slightly there may be no reason to immediately alert the user. However, when the voltage the thresholds were exceeded e.g. by 3V, the alarm to the user may better activated immediately. A similar approach may also be used to modulate the volume or the tone of the alarm in accordance with a detected voltage.

In yet another additional example embodiment of the present invention, the circuit is further provided with a connection detector to notify said circuitry that an external connector has been connected/disconnected to said connector. The connection detector may be used to "wake" a device from a sleep mode if and when a connection is detected. The connection detector may also be used to let a device enter sleep mode if and when a disconnection is detected. The connection detector may be implemented by a switching connector, wherein a contact/switch in the connector indicates if an external connector is connected or not. It is also contemplated to include the connection detector in the control element itself, wherein said connection detector is responsive to/triggered by voltages detected at said connector contacts.

In still another additional example embodiment said control element is connected to said circuitry to control the switches of the switch matrix in accordance with signals received from said circuitry. This embodiment is directed to the case that single applications require different combinations of contacts to be able to communicate with connected devices.

According to another aspect of the present invention a mobile electronic device is provided, being equipped with an over-voltage protection circuit as disclosed in the preceding specification, wherein said control element is connected to said circuitry to control the switches of the over-voltage protection circuit in accordance with signals received from said circuitry or received from said connector.

In an example embodiment said mobile device further comprises a mobile telephone. This embodiment may serve to protect a mobile telephone from over-voltages received from different peripheral devices such as chargers, external power supplies or connections to data processing devices or hands-free operation equipment.

In another example embodiment said mobile device further comprises an audio player device. In another example embodiment said mobile device further comprises an audio recorder device. These embodiments may serve to protect the mobile device from over-voltages applied at line-out connectors, the line-in connectors or microphone/loudspeaker connectors.

In yet another example embodiment said mobile device further comprises a video player device. In yet another example embodiment said mobile device further comprises a video recorder device. These embodiments may serve to protect the mobile device from over-voltages applied at video in/video out, line-out connectors, the line-in connectors or microphone/loudspeaker connectors.

In yet another example embodiment said mobile device is further provided with a camera such as a video camera. This embodiment may serve to protect the mobile device from over-voltages applied at video in/video out, line-out connectors, the line-in connectors or microphone/loudspeaker connectors.

According to another example embodiment a method for operating an over-voltage protection circuit for protecting a circuitry of a mobile terminal device from being damaged by over-voltage received at a connector of said mobile device is provided. Said over-voltage protection circuit being connected between internal contacts to said circuitry of a mobile device and said contacts of said connector. The method comprises determining voltages received at contacts of the connector, determining voltages at said internal contacts of the circuitry, and closing a switch connected between said contacts of the connector and said internal contacts of the circuitry in the voltages are within predetermined voltage limits.

In an example embodiment said method further comprises determining voltages at said internal contacts of the circuitry and closing a switch connected between said contacts of the connector and said internal contacts of the circuitry in the voltages are within predetermined voltage limits.

It may be noted that the steps of determining the voltage may just reside in a determination if the voltage exceeds a selected reference voltage or not.

In an example embodiment said method further comprises opening a connection between said contacts of the connector and/or said internal contacts of the circuitry exceed predetermined voltage limits. It may be noted that in case of closed switches both measurements should basically yield the same voltage values.

In another example embodiment said method further comprises receiving information related to the said voltage limits, and operating said over-voltage protection circuit accordingly. This embodiment is especially applicable to mobile devices using different applications that are operable with different voltage swings.

In yet another example embodiment said method is executed in an over-voltage protection circuit further comprising a switch matrix. The switch matrix is interconnected between at least two of said electrical contacts of said connector and at least two of said internal contacts to said circuitry. In this example embodiment said method further comprises reallocating the connections between the contacts of said connector and said internal contacts to said circuitry, in accordance with said determined voltages received at contacts of the connector, and said determined voltages at said internal contacts of the circuitry.

In another additional example embodiment reallocation is performed in accordance with signals/information received via a connection to the circuitry of the mobile terminal device. This embodiment serves to enable the circuitry of the mobile terminal to decide which contacts of the connector are allocated to which internal contacts to the circuitry of the mobile terminal device. This embodiment may serve to reallocate said connections for each application (or application specific circuit) of said mobile (terminal) device.

In an additional example embodiment said method is performed on a mobile terminal device further comprising a battery. In this embodiment said over-voltage protection circuit is connected to said battery (e.g. via a battery voltage determining unit). In this example embodiment the method further comprises determining the battery voltage of a battery of a mobile device, and opening the switches between said contacts of the connector and said internal contacts of the circuitry if the battery falls below a predetermined voltage threshold. The battery voltage may be determined with a voltage measurement unit implemented in or connected to said control unit.

In still another additional example embodiment said method further comprises opening at least one of the switches between said contacts of the connector and said internal contacts of the circuitry, and sending a signal indicating at least one of the switches between said contacts of the connector and said internal contacts of the circuitry has been opened to said circuitry. This embodiment serves as a watchdog functionality to alert the user or the circuitry of the mobile device that an over-voltage condition has been detected. It is also envisaged to stop or notify an application using said connector that an over-voltage event has occurred, to cause an output of an alert to stop a user from connecting over-voltage devices to the connector/the mobile device.

The system includes partial accessory detection and additionally there are several possibilities that user may make wrong connections or wrong selections from a menu and therefore a high voltage low impedance signal especially LINE-IN may destroy integrated circuits of the mobile device.

In an additional example embodiment said method further comprises setting a timer if it is detected that said a voltage exceeds said predetermined voltage threshold and outputting said signal after the timer has run off after a determined period of time.

In yet another additional example embodiment said method further comprises detecting that an external connector has been connected/disconnected at said connected of said mobile device, and notifying said circuitry that an external connector has been connected/disconnected at said connector. This embodiment may be used to wake up the protected device if a connection to an external connector has been detected or to set said protected a device into a sleep mode if it has been detected that a connector has been disconnected.

According to another aspect of the present invention, a computer program product downloadable from a server for carrying out the method of the preceding description is provided, which comprises program code means for performing all of the steps of the preceding methods when said program is run on a computer or a network device.

According to yet another aspect of the invention, a computer program product is provided comprising program code means stored on a computer readable medium for carrying out the methods of the preceding description, when said program product is run on a computer or a network device.

According to another aspect of the present invention a computer data signal is provided. The computer data signal is embodied in a carrier wave and represents a program that makes the computer perform the steps of the method contained in the preceding description, when said computer program is run on a computer, or a network device.

In the following, the invention will be described in detail by referring to the enclosed drawings in which:

FIG. 1 shows a signal-multiplexing table based on a 4-contact plug.

Figure 2A:
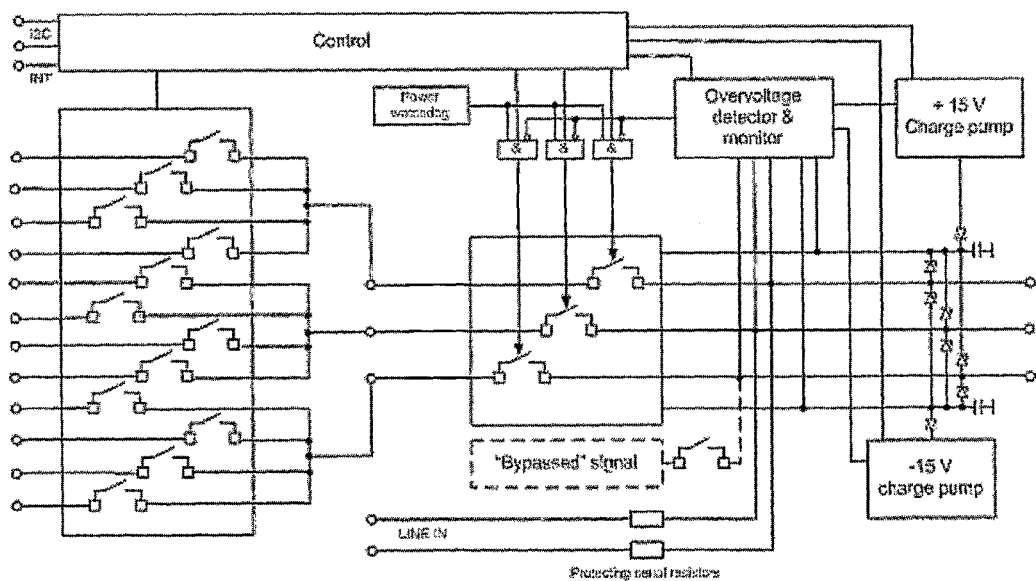
FIGS. 2B and 2B are circuit diagrams of sophisticated embodiments of the present invention provided with a switching matrix between the over-voltage protection circuit and the contacts of said connectors.

In the detailed description which follows, identical components have been given the same reference numerals, regardless of whether they are shown in different embodiments of the present invention. In order to clearly and concisely illustrate the present invention, the drawings may not necessarily be to scale and certain features may be shown in somewhat schematic form.

FIG. 1 shows as an example a signal multiplexing table based on a 4-contact plug. The columns of the table represent different signal types as audio, video and digital signals. The four contact plug system has mainly output signals but also inputs as L</R<audio input for recording, wherein the voltage may be up to 7 Vpp that is + or −3.5 Vpeak. It may also happen that the voltage rises to + or −7 Vpeak level. Also special fault cases or misuses expect that there is margin to provide safe operation up to + or −14 V. Such high voltages may come from DC voltage supplies having a similar connector (or form factor) or from a connection to AC signals which might cause over-voltage cases where the I/O circuitry protection diodes are clamping the signal.

The signals are multiplexed using 4 lines including common ground. To guarantee intended connection the system must correctly recognize connected signals or it must be robust to withstand erroneous use as the user may not know all signal levels and impedances. For instance user may connect too high voltage into line-in while the system still routes signal to output stages which withstand voltages between 0V and 1.8 V only.

Also there are various adapters which are not intended to be used with a mobile terminal device while users may apply these adapters causing faulty signal detection and signal routing.

FIG. 2A is a circuit diagram of a sophisticated embodiment of the present invention provided with a switching matrix between the over-voltage protection circuit and the contacts of said connectors. On the left side multiplexing switches are (or a switching a matrix is) located which can be controlled to switch any required signal combination to the 3 signal lines and the ground line (ground line not depicted). In the middle there are three switches which isolate the sensitive engine circuitry from the connector on the right hand side. There are voltage detectors which monitor the voltage on the right side of the switches and when the voltage exceeds set values (negative/positive) the circuit opens the switches and interrupts the connections. There is also a watchdog checking if the battery voltage and opening protection switches when the battery voltage decreases. Line in signals that may show high voltages and low impedances are routed via high resistance resistors, which in combination with input impedance of the next stage reduce the voltage and current to safe levels. These kind of serial resistors are not applicable to certain output signals as e.g. video signals which have to show exactly 75 ohm source/end impedance. Additionally when parallel termination is used there is no protection resistance in series requiring the described protection switches. The protection levels can be set separately to each switch and also separate levels can be defined in negative and positive side of the input voltage swing.

The circuitry may use high-voltage CMOS technology that specifies for instance 35 V as maximum supply voltage. Internal charge-pumps are built-in to provide supply voltage for the switches and in the case that battery signal disappears; the input signal rectifies supply voltage via the protection diodes. The system is controlled via an I2C control bus. There is an interrupt signal (INT) indicating fault-condition for the control processor that may provide feedback on user menu system on the display. There may be also bypassed signals which may relay on own dedicated protection. The protection may also be shared with the 3 connectors which are specifically protected. It is seems also feasible to protect only the three signal lines rather than implementing a protection system for any system in the circuitry to avoid unnecessary complexity of the system.

Figure 2B:
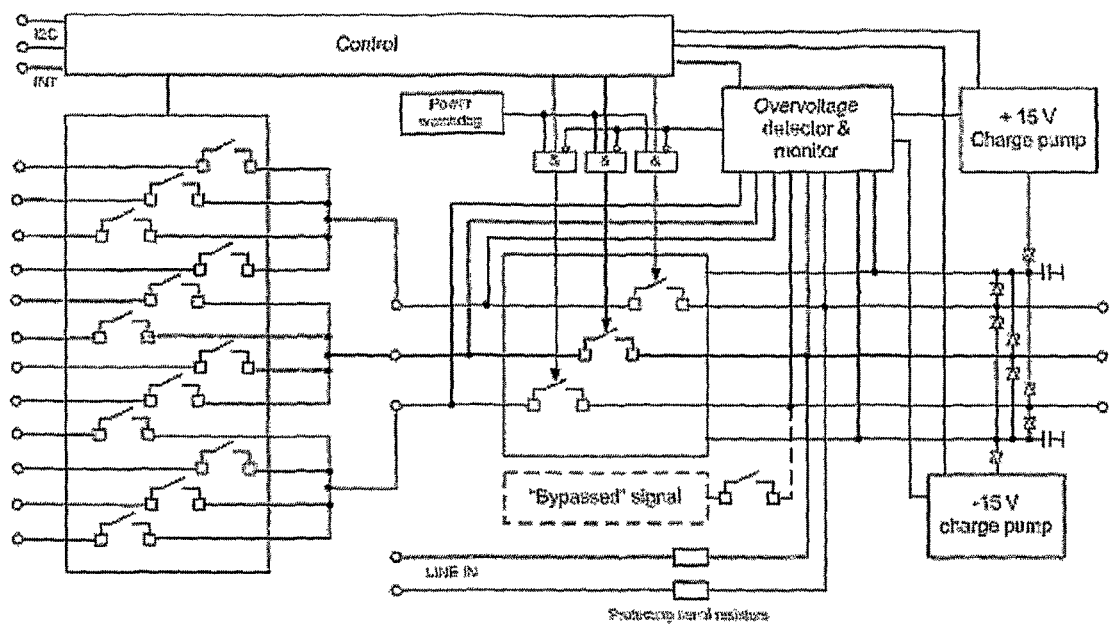

FIG. 2B is a circuit diagram of a sophisticated embodiment of the present invention provided with a switching matrix between the over-voltage protection circuit and the contacts of said connectors. On the left side multiplexing switches are (or a switching a matrix is) located which can be controlled to switch any required signal combination to the 3 signal lines and the ground line (ground line not depicted). In the middle there are three switches which isolate the sensitive engine circuitry from the connector on the right hand side. There are voltage detectors which monitor the voltage on the both sides of the switches and when the voltage exceeds set values (negative/positive) the circuit opens the switches and interrupts the connections. There is also a watchdog checking if the battery voltage and opening protection switches when the battery voltage decreases. Line in signals that may show high voltages and low impedances are routed via high resistance resistors, which in combination with input impedance of the next stage reduce the voltage and current to safe levels. These kind of serial resistors are not applicable to certain output signals as e.g. video signals which have to show exactly 75 ohm source/end impedance. Additionally when parallel termination is used there is no protection resistance in series requiring the described protection switches. The protection levels can be set separately to each switch and also separate levels can be defined in negative and positive side of the input voltage swing.

The circuitry may use high-voltage CMOS technology that specifies for instance 35 V as maximum supply voltage. Internal charge-pumps are built-in to provide supply voltage for the switches and in the case that battery signal disappears; the input signal rectifies supply voltage via the protection diodes. The system is controlled via an I2C control bus. There is an interrupt signal (INT) indicating fault-condition for the control processor that may provide feedback on user menu system on the display. There may be also bypassed signals which may relay on own dedicated protection. The protection may also be shared with the 3 connectors which are specifically protected. It is seems also feasible to protect only the three signal lines rather than implementing a protection system for any system in the circuitry to avoid unnecessary complexity of the system.

The detection may include two different detection levels as e.g. upper and lower voltage limits. It is envisaged to detect over-voltages and under-voltages (negative voltages). It is also envisaged to select different over-voltages and under-voltages (negative voltages) for different switching positions of the switching matrix. For instance in audio line-in mode the thresholds for a certain connector pin can be set to −4V to +4V and in a video-out mode the thresholds for the same connector pin can be set −0.3V to +1.8V. It may be noted that the The programmability means that we set +/− detection levels for each mode (for each application running on a device and using said connector) i.e. with each signal separately. The inputs are always protected. As marked to FIG. 2 the line-in is having big serial resistors which are protecting it while if the switches are in wrong mode high voltage may be switched to the sensitive circuits. In this case lower thresholds will make detection and switch opening.

In line-in mode higher than specified voltage may be detected and a warning for the user may be output (acoustically via loudspeaker or headset, optically via display or mechanically via e.g. vibration alarm). The switches are open while extra protection in this case could be made with shorting switches in line-input (in the point where the FIGS. 2A and 2B have the text LINE IN. This "extra" option is naturally depending on circuit implementation. Shorted inputs are in this case not harmful as there are rather big serial resistors (marked "Protecting serial resistors") provided which limit the maximum current that may occur.

Figure 3:
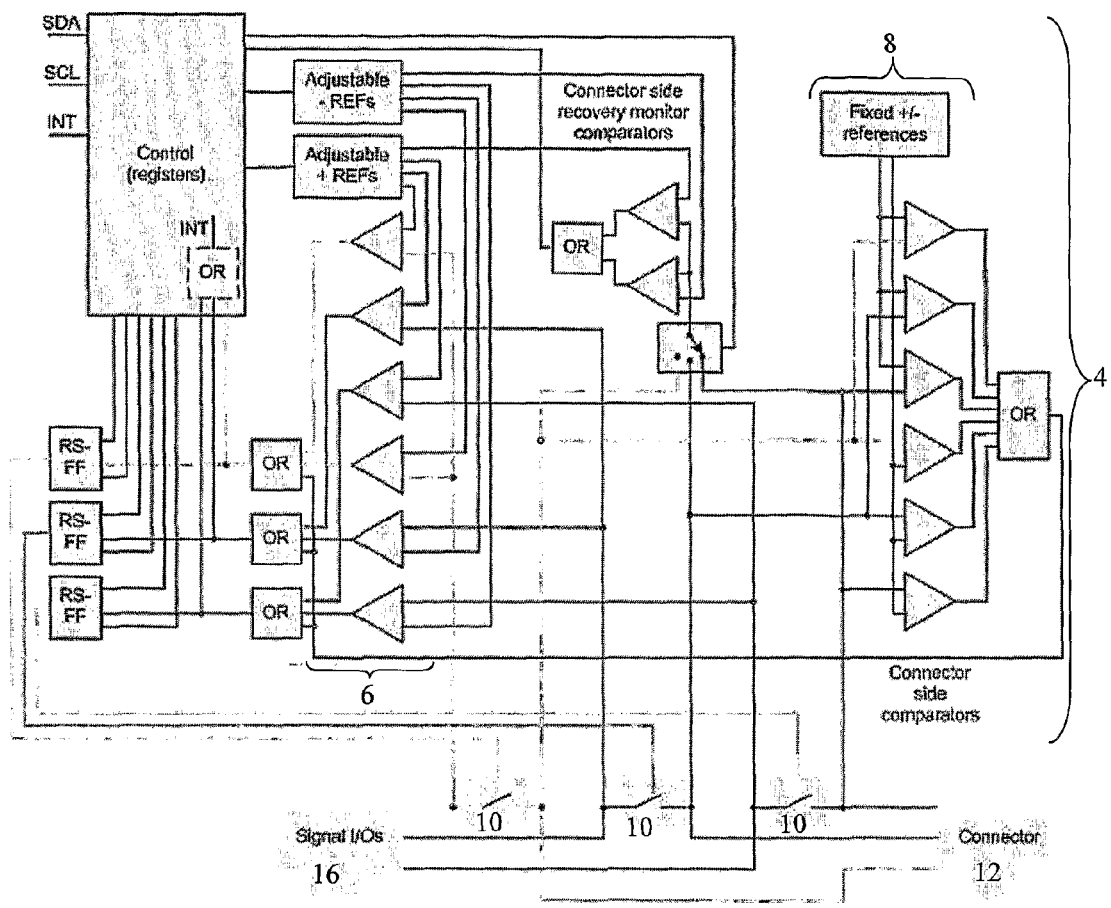
FIG. 3 is a circuit diagram of a hardware-implemented embodiment of an over-voltage protection circuit.

FIG. 3 is a circuit diagram of a hardware-implemented embodiment of an over-voltage protection circuit. The connector 12 side includes detectors/comparators (or first voltage determining units 6) comparing to fixed voltage that opens the switches 10 via OR ports and RS-flip-flops (FF) which are effecting to all switches 10 simultaneously.

Signal I/O side or (phone) circuitry side 16 has programmable detectors/comparators (or second voltage determining units 8) that are provided with separately adjustable negative and positive thresholds with low voltage granularity to provide optimal protection. The sensitive protection is necessary as there are very sensitive ICs in the mobile terminal device which may e.g. not withstand negative voltages below −0.3 V or positive voltages above 1.95 V. The detectors control directly RS-flip-flops individually setting the switches off.

The switching-off has to happen very fast and thus it is performed by direct hardware control in combination with software defined thresholds. Any time a forced switch-off has occurred; an interrupt is made/sent to the circuitry of the mobile terminal device. Software may detect if one or all of the interrupt detectors has/have been reset in the control register area. This shows that the over-voltage caused triggering the connector or circuit I/O side comparators. Additionally there is a measurement system that can detect the voltage on the connector side to provide an aid for recovery. To minimize circuitry a detector is provided that can check each line separately under software-control with the aid of a multiplexing switch. After detection that the over-voltage condition is not longer present, the switches can be closed or user instructions/warnings may be shown on the mobile terminal device. This measurement may be performed always before the switches are closed to achieve enhanced safety as any time the circuit switches are opened due to over-voltage. When opening the switches there is a very short voltage pulse present that may have an adverse effect. However this pulse may have length of only few nanoseconds and is therefore not destructive. The protection switches are also directly under control via reset (R) and set (S) signals to each of the flip-flops. The protection system is additionally provided with an OR-gate in the inside the flip-flop-block. In the figure the section indicated with reference number 4 relates to the control element. In the figure the section indicated with reference number 6 relates to the first voltage determining units. In the figure the section indicated with reference number 8 is related to the second voltage determining units. Reference signs 10 refer to the electrically operated switches. Reference sign 12 denotes the connector. Reference sign 16 denotes the contacts to the circuitry of the mobile device.

Figure 4:
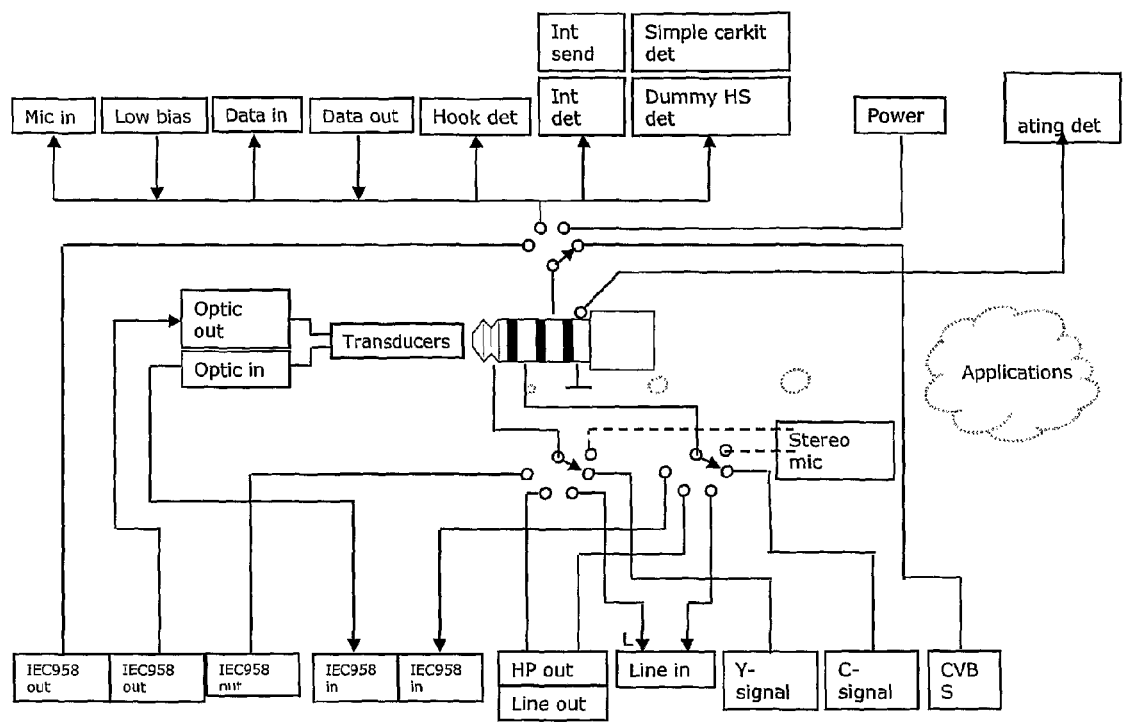
FIG. 4 is a diagram of a basic embodiment of a switching matrix to distribute the signal contacts of a connector to different applications or application specific interfaces.

FIG. 4 is a diagram of a basic embodiment of a switching matrix to distribute the signal contacts of a connector to different applications or application specific interfaces. To increase the clarity of the diagram the over-voltage protection circuit has been omitted in the figure.

Figure 5A:
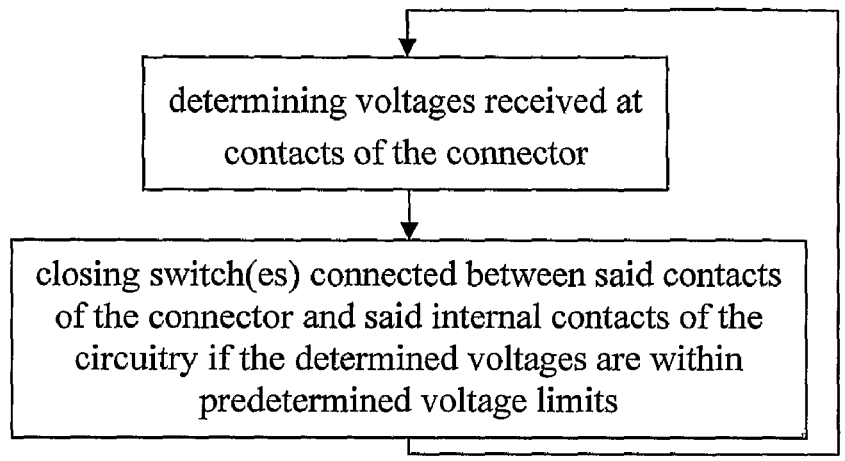
FIGS. 5A, 5B and 5C are flowcharts of basic embodiments of the method of the present invention.

FIG. 5A is a flowchart of a basic embodiment of the method for operating an over-voltage protection circuit for protecting a circuitry of a mobile terminal device from being damaged by over-voltage received at a connector of said mobile device. It is expected that said over-voltage protection circuit is connected between internal contacts to a circuitry and contacts of a connector. The method comprises repeatedly: determining voltages received at contacts of the connector (step one) and closing switch(es) connected between said contacts of the connector and said internal contacts of the circuitry if the determined voltages are within predetermined voltage limits (step three).

Figure 5B:
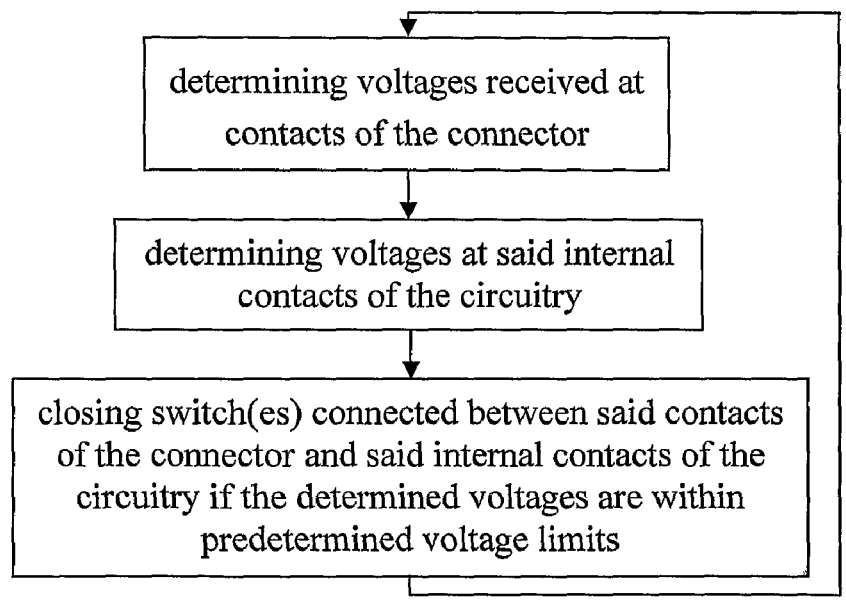

FIG. 5B is a flowchart of a basic embodiment of the method for operating an over-voltage protection circuit for protecting a circuitry of a mobile terminal device from being damaged by over-voltage received at a connector of said mobile device. It is expected that said over-voltage protection circuit is connected between internal contacts to a circuitry and contacts of a connector. The method comprises repeatedly: determining voltages received at contacts of the connector (step one), determining voltages at said internal contacts of the circuitry (step two), and closing switch(es) connected between said contacts of the connector and said internal contacts of the circuitry if the determined voltages are within predetermined voltage limits (step three).

Figure 5C:
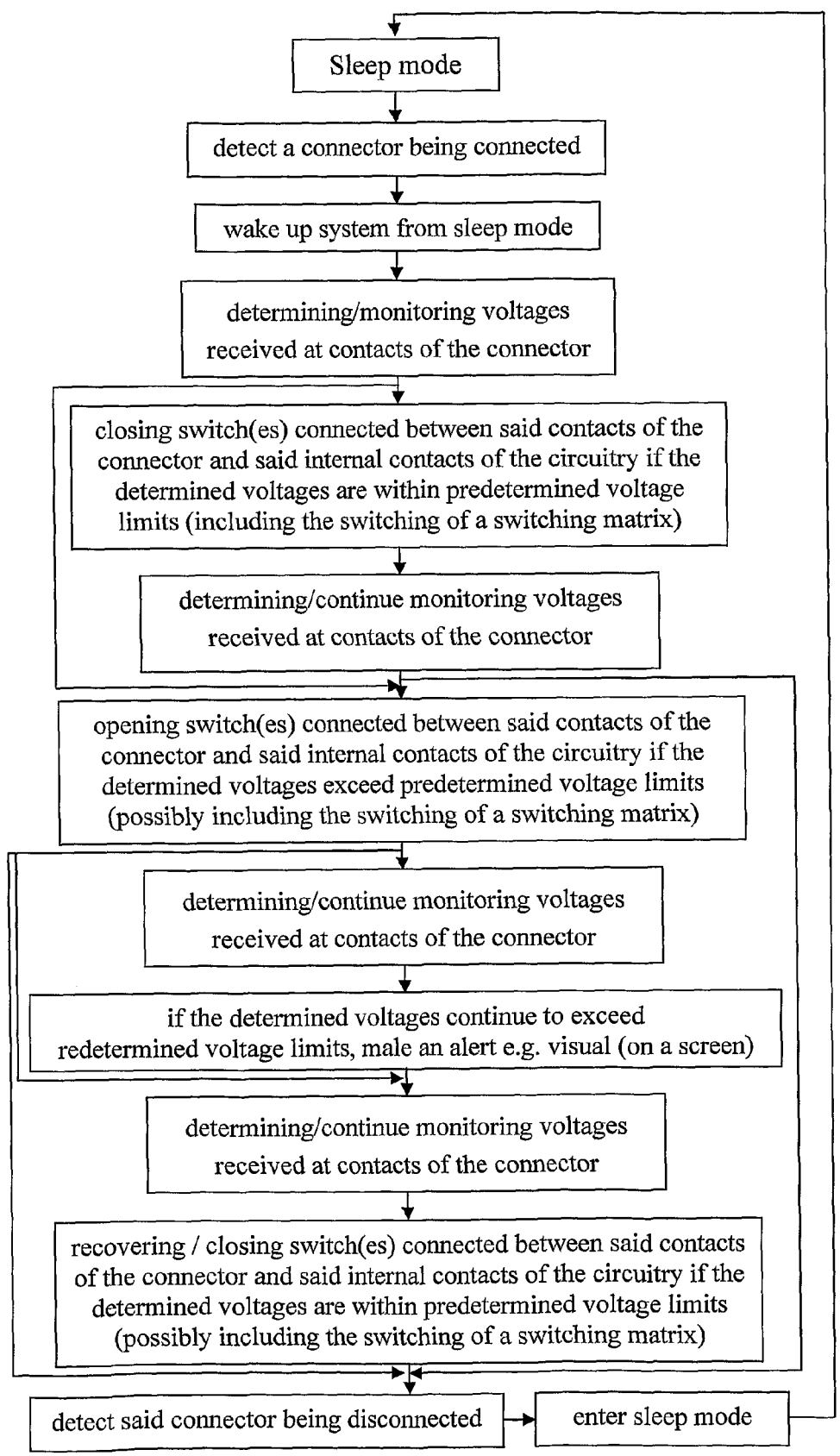

FIG. 5C is a flowchart of a more sophisticated embodiment of the method for operating an over-voltage protection circuit for protecting a circuitry of a mobile terminal device from being damaged by over-voltage received at a connector of said mobile device. It is expected that said over-voltage protection circuit is connected between internal contacts to a circuitry and contacts of a connector. The method is repetitive. The method starts from a state in which the mobile device is in a sleep mode. In the sleep mode a it is detected that a connector is connected (such as e.g. a plug being inserted in to a socket of the mobile device). In a next step the system performs a wake up procedure to wake the system from the sleep mode. The system itself or the control device of the device may decide if the wake up procedure is performed. It is for example envisaged not to wake up the system if the control device only detects that a charger has been connected.

After the connection has been detected (and eventually the system has been performed a wake up procedure) the voltages received at contacts of the connector are determined/monitored.

If the monitored voltages are within predetermined voltage limits the switch(es) connected between said contacts of the connector and said internal contacts of the circuitry are closed (and eventually the switches of a switching matrix are switched in accordance with the determined voltages).

If the monitored voltages are not within predetermined voltage limits the switch(es) connected between said contacts of the connector and said internal contacts of the circuitry are left open.

After the switches have been closed or left opened, the monitoring/determining of the voltages received at contacts of the connector is continued.

If the monitored voltages exceed said predetermined voltage limits (after the switches have been closed) the switch(es) connected between said contacts of the connector and said internal contacts of the circuitry are (re-) opened.

After the switches have been opened or left open, the monitoring/determining of the voltages received at contacts of the connector is continued.

If the determined voltages continue to exceed predetermined voltage limits (for a predetermined time), an alert e.g. visual (on a screen) and/or audible signal is output to a user, while continuing monitoring voltages received at contacts of the connector.

The switches connected between said contacts of the connector and said internal contacts of the circuitry are recovered/closed if the determined voltages do not longer exceed said predetermined voltage limits (and possibly a switching matrix is also re-switched).

If it is detected that said connector is disconnected, the system may perform procedures to re-enter the sleep mode.

Figure 6A:
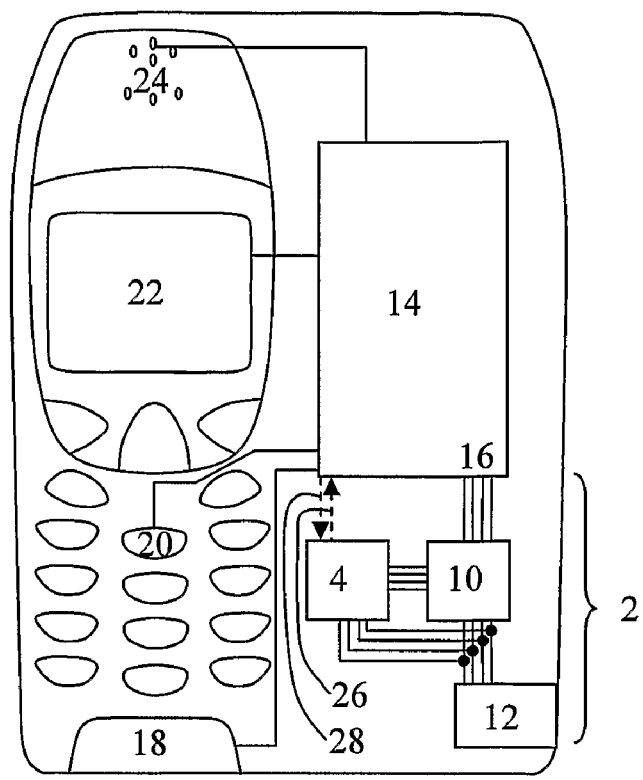
FIGS. 6A and 6B are schematic block diagrams of mobile terminal devices provided with an over-voltage protection circuit.

FIG. 6A is a schematic block diagram of a mobile terminal device 30 provided with an over-voltage protection circuit. The mobile terminal 30 is embodied as a mobile telephone with a mobile device circuitry 14 with internal contacts 16 to said circuitry. The mobile device is further provided with an earpiece 24, a microphone 18, a keypad 20 and a display 22 (the radio components, the antenna and the battery have been omitted for the sake of clarity). The phone is also provided with a connector 12 to connect peripheral devices to the mobile telephone. The phone is also provided with an over-voltage protection circuit 2. The over-voltage protection circuit 2 comprises a control element 4 connected to a switch (element) 10 to operate said switch (element). The over-voltage protection circuit 2 also comprises a (not depicted) first voltage determining unit (6) to detect a voltage between said contact of said connector 12 and said electrically operated switch (element) 10. The control element 4 is configured to open or close said switch (element) 10 based on the voltages detected at said contact of said connector. The control element 4 may be connected to the mobile device circuitry 14 via line 26 to send an interrupt signal to the mobile device circuitry 14 in case an over-voltage event has occurred and one of the over voltage protection switches of the switch block has been opened. The control element 4 may also be connected to the mobile device circuitry 14 via line 28 to receive e.g. actualized threshold voltage data (or information how to set the switches of a not depicted switching matrix).

Figure 6B:
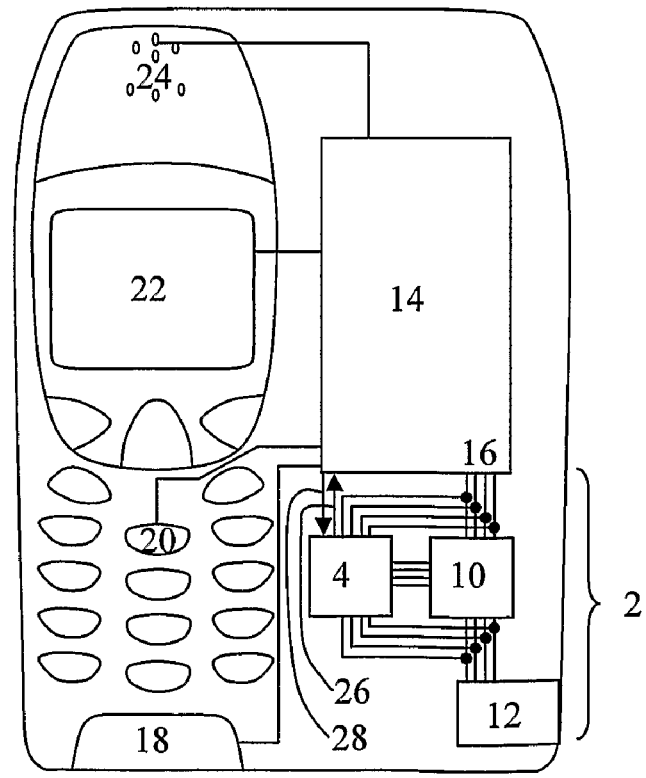

FIG. 6B is a schematic block diagram of a mobile terminal device 30 provided with an over-voltage protection circuit. The mobile terminal 30 is embodied as a mobile telephone with a mobile device circuitry 14 with internal contacts 16 to said circuitry. The mobile device is further provided with an earpiece 24, a microphone 18, a keypad 20 and a display 22 (the radio components, the antenna and the battery have been omitted for the sake of clarity). The phone is also provided with a connector 12 to connect peripheral devices to the mobile telephone. The phone is also provided with an over-voltage protection circuit 2. The over-voltage protection circuit 2 comprises a control element 4 connected to a switch (element) 10 to operate said switch (element). The over-voltage protection circuit 2 also comprises a (not depicted) first voltage determining unit (6) to detect a voltage between said contact of said connector 12 and said electrically operated switch (element) 10. Additionally, the over-voltage protection circuit 2 comprises a (not depicted) second voltage determining unit (8) to detect a voltage between said internal contact to said circuitry and said electrically operated switch. The control element 4 is configured to open or close said switch (element) 10 based on the voltages detected at said internal contact to said circuitry and said contact of said connector. The control element 4 is connected to the mobile device circuitry 14 via line 26 to send an interrupt signal to the mobile device circuitry 14 in case an over-voltage event has occurred and one of the over voltage protection switches of the switch block has been opened. The control element 4 is connected to the mobile device circuitry 14 via line 28 to receive e.g. actualized threshold voltage data (or information how to set the switches of a not depicted switching matrix).

The over-voltage protection circuit of the present invention can monitor the voltages having fixed or adjustable negative and positive thresholds, wherein circuit arrangement having serial protection switches which are opened if and when over-voltage conditions occur. The over-voltage protection circuit of the present invention may also comprise a recovery system being autonomic or software controlled to interrupt generation on detected over-voltage/switch opening.

The present invention is especially applicable for 4-contact AV connectors which are multiplexed for several applications having input and output signals.

This application contains the description of implementations and embodiments of the present invention with the help of examples. It is to be noted that the present invention is not restricted to audio/video connectors. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. An over-voltage protection circuit for a mobile device comprising:
   at least one connector comprising at least one electrical contact for connecting an external device and at least one internal contact to a circuitry, wherein an electrically operated switch connected between the at least one electrical contact of said connector and said internal contact, a control element for operating said switch, a first voltage determining unit configured to detect a voltage at a point between said at least one external contact and said electrically operated switch, said first voltage determining unit being connected to said control element, and wherein said control element is configured to open or close said switch based at least in part on the voltage detected by said first voltage determining unit.

2. The over-voltage protection circuit according to claim 1 further comprising:
   a second voltage determining unit configured to detect a voltage at a point between said at least one internal contact and said electrically operated switch, said second voltage determining unit being connected to said control element, wherein said control element is configured to open or close said switch based at least in part on the voltage detected by said second voltage determining unit.

3. The over-voltage protection circuit according to claim 2, further comprising:
at least one further electrically operated switch interconnected between at least one further electrical contact of said connector and at least one further internal contact to said circuitry, wherein said control element is respectively connected to each said at least one further electrically operated switch to control said switches, wherein said over-voltage protection circuit further comprises a further first voltage determining unit to respectively detect a voltage at a point between each said further electrical contact of said connector and said further electrically operated switch, wherein said over-voltage protection circuit further comprises a further second voltage determining unit to respectively detect a voltage at a point between each said further internal contact and said further electrically operated switch, wherein said further electrically operated switch is connected to said control element, wherein said control element is configured to open or close said switches based at least in part on the voltages detected by said further first and second voltage determining units.

4. The over-voltage protection circuit according to claim 1, further comprising:
at least one further electrically operated switch interconnected between at least one further electrical contact of said connector and at least one further internal contact to said circuitry, wherein said control element is respectively connected to each said at least one further electrically operated switch to control said switches, wherein said over-voltage protection circuit further comprises a further first voltage determining unit to respectively detect a voltage at a point between each said further electrical contact of said connector and said further electrically operated switch, wherein said further electrically operated switch is connected to said control element, wherein said control element is configured to open or close said switches based at least in part on the voltages detected by said further first voltage determining unit.

5. The over-voltage protection circuit according to claim 2, further comprising at least one of the following:
a) a switch matrix interconnected between at least two of said electrical contacts of said connector and at least two of said internal contacts to said circuitry, to reallocate the connections between the at least two contacts of said connector and said at least two internal contacts to said circuitry;
b) a second switch matrix interconnected between said electrically operated switch and said contacts of said connector;
c) a third switch matrix interconnected between said electrically operated switch and said internal contacts to said circuitry;
wherein the control element is connected to said circuitry to control at least one switch of any of the switch matrixes in accordance with at least one signal received from said circuitry.

6. The over-voltage protection circuit according to claim 5, wherein the switch matrix comprises said electronically operated switch.

7. The over-voltage protection circuit according to claim 1 wherein said control element further comprises:

a battery voltage determining unit to detect a battery voltage of a battery of said mobile device, and wherein the control element is configured to open said electrically operated switch based at least in part on whether the battery voltage falls below a predetermined threshold value.

8. The over-voltage protection circuit according to claim 1, wherein said control element further comprises:
an output signal contact connected to said circuitry to notify said circuitry that the electrically operated switch has been opened.

9. The over-voltage protection circuit according to claim 8, wherein said control element further comprises:
a timer to output said signal after a determined period of time.

10. The over-voltage protection circuit according to claim 1, further comprising:
a connection detector to notify said circuitry that an external connector has been connected and/or disconnected at said at least one connector.

11. A mobile electronic device comprising:
an over-voltage protection circuit comprising at least one connector comprising at least one electrical contact for connecting an external device and at least one internal contact to a circuitry, wherein an electrically operated switch connected between the at least one electrical contact of said connector and said internal contact, a control element for operating said switch, a first voltage determining unit configured to detect a voltage at a point between said at least one external contact and said electrically operated switch, said first voltage determining unit being connected to said control element, and wherein said control element is configured to open or close said switch based at least in part on the voltage detected by said first voltage determining unit, wherein said control element is connected to said circuitry to control the electrically operated switch of the over-voltage protection circuit in accordance with at least one voltage signal received from said circuitry or received from said at least one connector; and
wherein said mobile electronic device is also configured as at least one of the following:
a) a mobile telephone;
b) an audio player or audio recorder device;
c) a video player or video recorder device;
d) a camera.

12. A method for operating an over-voltage protection circuit for a mobile device, wherein the over-voltage protection circuit comprises at least one electrical contact for connecting an external device, at least one internal contact to a circuitry, and an electrically operated switch connected between the at least one electrical contact of said connector and said internal contact, comprising:
determining a first voltage at a point between said at least one external contact and said electrically operated switch;
opening said electrically operated switch if the first voltage exceeds a predetermined voltage limit;
determining a second voltage at a point between said at least one internal contact and said electrically operated switch; and
opening said electrically operated switch if the second voltage exceeds a predetermined voltage limit.

13. The method of claim 12, wherein the over-voltage protection circuit further comprises a switch matrix interconnected between at least two of said electrical contacts of said connector and at least two of said internal contacts to said circuitry, said method further comprising:

reallocating connections between the at least two contacts of said connector and said at least two internal contacts to said circuitry in accordance with at least the first voltage.

14. A mobile electronic device comprising:

an over-voltage protection circuit for a mobile device comprising at least one connector comprising at least one electrical contact for connecting an external device and at least one internal contact to a circuitry, wherein an electrically operated switch connected between the at least one electrical contact of said connector and said internal contact, a control element for operating said switch, a first voltage determining unit configured to detect a voltage at a point between said at least one external contact and said electrically operated switch, said first voltage determining unit being connected to said control element, and wherein said control element is configured to open or close said switch based at least in part on the voltage detected by said first voltage determining unit;

a battery connected to the at least one connector;

wherein the first voltage determining unit is configured to detect a voltage of the battery.

15. The method of claim 12, further comprising:

sending a signal indicating that the electrically operated switch has been opened.

16. The method of claim 15, further comprising:

setting a timer after the first voltage has exceeded a threshold value; and outputting said signal after the timer has run off after a determined period of time.

17. The method of claim 12, further comprising:

detecting that an external connector has been connected and/or disconnected at said at least one electrical contact; and notifying said circuitry that an external connector has been connected and/or disconnected at said at least one electrical contact.

18. A computer program product for operating an over-voltage protection circuit, the computer program product comprising a non-transitory computer-readable storage medium bearing computer program code embodied therein for use with a computer processor, wherein the over-voltage protection circuit comprises at least one electrical contact for connecting an external device, at least one internal contact to a circuitry, and an electrically operated switch connected between the at least one electrical contact of said connector and said internal contact, the computer program code comprising:

code configured to cause the over-voltage protection circuit to determine a first voltage at a point between said at least one external contact and said electrically operated switch; and code configured to cause the over-voltage protection circuit to open said electrically operated switch if the first voltage exceeds a predetermined voltage limit.

* * * * *